United States Patent
Schmed et al.

(10) Patent No.: US 9,445,695 B2
(45) Date of Patent: Sep. 20, 2016

(54) URINAL, AND METHOD FOR REPLACING AN ODOR SEAL OF A URINAL

(75) Inventors: Arthur Schmed, Wollerau (CH); Werner Balkau, Schwandi (CH)

(73) Assignee: URIMAT HOLDING AG, Wollerau (CH)

( * ) Notice: Subject to any disclaimer, the term of this patent is extended or adjusted under 35 U.S.C. 154(b) by 121 days.

(21) Appl. No.: 14/234,668

(22) PCT Filed: Jul. 19, 2012

(86) PCT No.: PCT/EP2012/064208
§ 371 (c)(1),
(2), (4) Date: Jan. 24, 2014

(87) PCT Pub. No.: WO2013/017424
PCT Pub. Date: Feb. 7, 2013

(65) Prior Publication Data
US 2014/0150171 A1    Jun. 5, 2014

(30) Foreign Application Priority Data
Aug. 2, 2011    (DE) .................. 10 2011 052 370

(51) Int. Cl.
| | |
|---|---|
| *E03D 13/00* | (2006.01) |
| *A47K 11/12* | (2006.01) |
| *E03C 1/28* | (2006.01) |
| *E03C 1/298* | (2006.01) |
| *B23P 6/00* | (2006.01) |

(52) U.S. Cl.
CPC .................. *A47K 11/12* (2013.01); *B23P 6/00* (2013.01); *E03C 1/28* (2013.01); *E03C 1/298* (2013.01); *E03D 13/00* (2013.01); *Y10T 29/4973* (2015.01)

(58) Field of Classification Search
CPC ....... A47K 11/12; E03D 13/00; E03C 1/288; E03C 1/28
See application file for complete search history.

(56) References Cited

U.S. PATENT DOCUMENTS

| | | | |
|---|---|---|---|
| 3,460,168 A | 8/1969 | Bruyne | |
| 8,622,090 B2 | 1/2014 | Larkin et al. | |
| 2002/0069913 A1* | 6/2002 | Gorges | ...................... E03C 1/28 137/247.13 |
| 2002/0163432 A1* | 11/2002 | Higgins | ........................ 340/540 |
| 2007/0006370 A1 | 1/2007 | Schroder | |
| 2011/0220211 A1 | 9/2011 | Larkin et al. | |

FOREIGN PATENT DOCUMENTS

| | | |
|---|---|---|
| AU | 2008 243 269 B1 | 4/2009 |
| CN | 1268203 A | 9/2000 |
| CN | 2703802 Y | 6/2005 |
| CN | 201085580 Y | 7/2008 |
| DE | 92 02 902 U1 | 5/1992 |

(Continued)

OTHER PUBLICATIONS

English translation of Search Report Issued Dec. 4, 2014 by State IP Office of China for CN 201280038382.6.

(Continued)

*Primary Examiner* — Janie Loeppke
(74) *Attorney, Agent, or Firm* — Panitch Schwarze Belisario & Nadel LLP

(57) ABSTRACT

The invention relates to a urinal having an odor seal or trap (2). The urinal is characterized by provision of another odor seal or trap (9), preferably connected in series with the first odor seal or trap (2).

11 Claims, 2 Drawing Sheets

(56) References Cited

FOREIGN PATENT DOCUMENTS

| DE | 202 20 156 U1 | 4/2004 |
| DE | 20 2011 000512 U1 | 5/2011 |
| FR | 2 740 792 A1 | 5/1997 |
| JP | 2003-082741 A | 3/2003 |
| WO | 2010057248 A1 | 5/2010 |
| WO | WO-2010/147322 A2 | 12/2010 |

OTHER PUBLICATIONS

Int'l Preliminary Report on Patentability issued Feb. 13, 2014 in Int'l Application No. PCT/EP2012/064208.

* cited by examiner

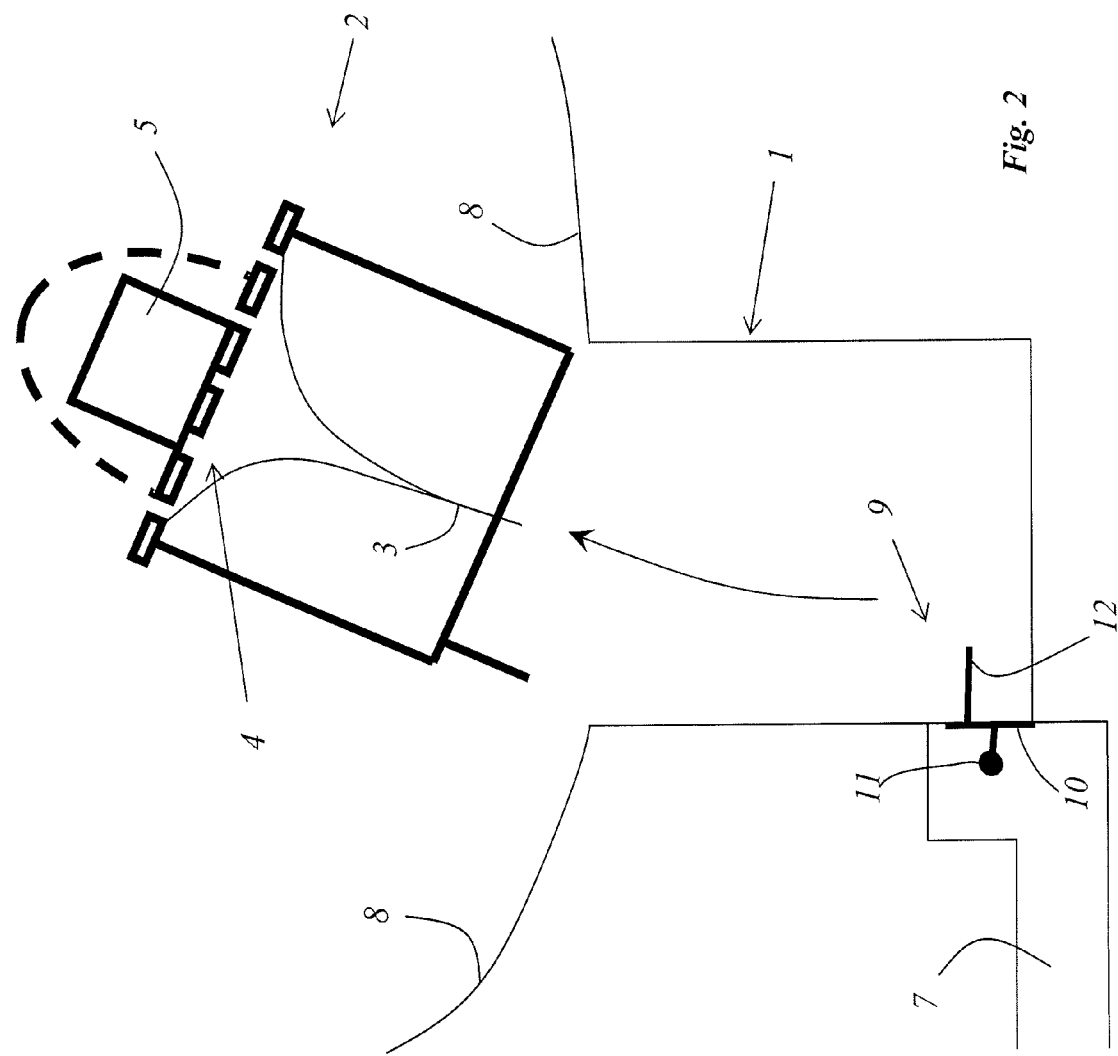

URINAL, AND METHOD FOR REPLACING AN ODOR SEAL OF A URINAL

CROSS-REFERENCE TO RELATED APPLICATIONS

This application is a national stage application (under 35 U.S.C. §371) of PCT/EP2012/064208, filed Jul. 19, 2012, which claims benefit of German application 10 2011 052 370.7, filed Aug. 2, 2011.

TECHNICAL FIELD AND STATE OF THE ART

The invention relates to a method for replacing an odor seal or trap of a urinal.

The invention also relates to a urinal having a replaceable odor seal or trap.

An insert component configured as an odor trap is known, for example, from German patent application DE 10 2009 008 574 A1. The odor trap is provided with an inlet surface that has at least one drainage opening that is covered by a covering hood placed onto it. The odor trap has a closure means which, in its basic position, closes the flow-connection between a drain and a drainage opening and which opens when a given amount of urine has flowed into the drain. The closure means has at least two chamber parts that delimit the volume of a chamber, whereby the first chamber part is a membrane part that lifts up from the other, second chamber when a given quantity of liquid has accumulated in the chamber, thereby establishing the flow-connection to the drainage opening.

Another odor trap for a dry urinal is known, for example, from Swiss patent specification CH 694 274 A5. This odor trap comprises a pot with an opening that is located in the upper section in the middle of a ring-shaped inlet surface and that is closed by a closure cap. The closure cap is pressed by a rod from below against the rim of the ring-shaped inlet surface. This closed state is maintained by a magnet located at the lower end of the rod and by another magnet that is installed in the bottom of the pot in that the two magnets having the same polarity repel each other. Once a sufficient quantity of urine and/or flushing water has accumulated on the closure cap, the latter is pushed downwards so that the liquid can drain.

Another type of insert component configured as an odor trap for a urinal is disclosed in European patent specification EP 1 076 739 B1. Instead of making use of the closure cap, this odor trap employs a float that floats on top due to the liquid level in the insert and that fits into the opening of the ring-shaped inlet surface.

Such insert components configured as odor traps are used in dry urinals and serve to close the drain leading into the sewage system so as to prevent odors from escaping from the sewage pipes. In addition, such odor traps are supposed to ensure that they completely discharge the urine into the drain so that no residues remain in the area of the odor trap. Water is not used for flushing as is normally done with conventional urinals, thereby saving on the consumption of water. In addition, disinfectant cubes can be placed onto the inlet surface of the odor trap, they are then dissolved by urine, thereby having a cleaning and disinfecting effect.

European patent application EP 1 382 758 A2 discloses a dry urinal having a mechanical odor trap and a bowl without a flushing rim. In this dry urinal, a diaphragm valve closes the drain liquid-tight or gas-tight when in a first position. The diaphragm valve can be switched to a second position in which the urine can drain through the diaphragm valve. In order to simplify the cleaning of the urinal that is operated as a dry urinal, the urinal and the downstream pipe system are flushed with flushing water by means of an externally controlled flushing system at prescribable time intervals. For this purpose, the bowl is provided with a special flushing water distributor that systematically distributes the flushing water in the bowl that does not have a flushing rim. Explicit mention is hereby made of the fact that this urinal should not be provided with a flushing rim. This is especially the case with an eye towards achieving a variable distance between the inlet and outlet of the flushing water connection.

In the urinals known from the state of the art, the odor trap has to be replaced from time to time. This often gives rise to the generation of unpleasant odors. This is especially severe in the case of large toilet facilities with several urinals in which all of the odor traps that have to be replaced are first removed and only subsequently are new odor traps put in place, one urinal at a time. In particular, a strong ammonia odor arises, which often still remains noticeable for several hours.

German utility model DE 299 00 010 U1 discloses an odor trap for a urinal. The odor trap has a replaceable pot that is inserted into the urinal. Moreover, an odor trap is provided in the pot frame of the downflow baffle in order to hold back sewage odor stemming from the drain line, and an odor trap is provided that floats on the urine that is in the pot and that is going to be collected. The odor trap has a floating element.

German patent application DE 10 2007 061 255 A1 discloses a system for flushing a vacuum toilet in an airplane. Aside from the standard odor trap directly in the drain line of the urinal, there is also an odor trap for a secondary flow line.

U.S. Pat. Appln. No. 2006/0101565 A1 discloses a special insert for a dry urinal.

German utility model DE 20 2008 002 130 U1 discloses a urinal with a mechanical odor trap. The odor trap has a flap that is balanced by a counterweight.

SUMMARY OF THE INVENTION

It is an objective of the present invention to put forward a method for replacing the odor seal or trap of a urinal that largely avoids the generation of unpleasant odors.

This objective is achieved by means of a method that is characterized by the following steps:
a) closing an additional odor seal or trap of the urinal,
b) removing the odor trap that is to be replaced,
c) inserting a new odor seal or trap that replaces the removed odor trap, and
d) opening the additional odor seal or trap.

Another objective of the present invention is to put forward a urinal in which the generation of unpleasant odors during maintenance work is largely avoided.

This further objective is achieved by means of a urinal which is characterized in that an additional odor seal or trap is provided, and in that the first odor trap and the additional odor trap are connected in series.

The invention entails the very special advantage that virtually no foul-smelling gases can escape during the replacement of the odor trap. This means that the urinal can already be used again immediately after the replacement procedure according to the inventive method, without inconveniencing the user with unpleasant smells. In actual practice, this also has the additional advantage that the odor trap can be replaced without the need to close off the restroom facilities for an extended period of time. On the contrary, the odor trap can be easily replaced, even within the scope of routine cleaning procedures.

Preferably, the new odor trap is installed in such a way that it is connected in series to the additional odor trap. This embodiment has the special advantage that, while the odor trap that is to be replaced is being replaced by a new odor trap, the additional odor trap can ensure a virtually gas-tight isolation from the outgoing drain lines to which the urinal is connected. In particular, it can be provided that the new odor trap is inserted in such a way that urine released into the bowl of the urinal first flows through the new odor trap and subsequently through the additional odor trap.

In an especially advantageous embodiment, the additional odor trap is automatically closed when the odor trap that is to be replaced is removed. Such an embodiment has the very special advantage that it prevents improper installation. Rather, it is ensured that, for the most part, one of the odor traps is always closed so that unpleasant odors cannot escape.

A particularly advantageous embodiment is one in which the additional odor trap is automatically opened when an insert component is inserted. In particular, it can be provided that the additional odor trap is coupled to an actuation mechanism for opening and/or closing the additional odor trap, said actuation mechanism being actuated by the insertion of an insert component.

In this context, it can be provided in an especially advantageous manner that the new odor trap is configured as the insert component and/or that the new odor trap has the insert component. As already mentioned, it can advantageously be provided that the additional odor trap can be automatically closed. In particular, it can advantageously be provided that the additional odor trap is automatically closed when the insert component is removed. In one embodiment, it is particularly advantageous that—also with respect to the closing procedure—the odor trap that is to be replaced is configured as the insert component and/or that the odor trap that is to be replaced has the insert component.

One embodiment in which the odor trap to be replaced is or has the insert component whose removal causes the additional odor trap to be automatically closed has the very special advantage that the service employees in charge of replacing the odor trap do not have to carry out the step of closing the additional odor trap themselves. In particular, this advantageously accounts for the fact that improper installation is prevented. In this context, it is particularly advantageous that the additional odor trap is immediately closed when the odor trap to be replaced is removed, so that even a brief escape of unpleasant gases is largely prevented.

The above-mentioned embodiment is particularly advantageous; here, the new odor trap is and/or has the insert component that causes the additional odor trap to open when it is inserted into the urinal. In this embodiment, the service employee in charge of replacing the odor trap does not have to open the additional odor trap in a separate step. Rather, the additional odor trap is opened automatically when the new odor trap is inserted. This has the additional special advantage that faulty installation is prevented. In particular, it is prevented that the additional odor trap inadvertently remains closed after the new odor trap has been inserted, which, in the worst case scenario, could cause urine to collect in the urinal.

A particularly advantageous embodiment is one in which the additional odor trap is automatically closed when the odor trap to be replaced is removed, and in which the additional odor trap is automatically opened again when the new odor trap is inserted. Such an embodiment has the very special advantage that the service employee in charge of replacing the odor trap does not have to carry out any additional steps, except for removing the odor trap that is to be replaced and inserting the new one. Rather, the additional odor trap is opened and closed completely automatically in such an embodiment.

Regarding such a solution, it is particularly advantageous if the additional odor trap is coupled to an actuation mechanism which, upon being triggered by the insertion of the insert component, opens the additional odor trap and closes it again when the additional insert component is removed.

Naturally, as an alternative to automatic opening and/or closing, it can also be provided that the additional odor trap is opened and/or closed manually.

An especially good protection against unpleasant odors is achieved when the additional odor trap is immediately closed before the odor trap that is to be replaced is removed. It is almost equally effective for the additional odor trap to be closed while the odor trap that is to be replaced is being removed.

As an alternative, however, it is also possible to close the additional odor trap immediately after the odor trap that is to be replaced has been removed. In such an embodiment, even though a small amount of foul-smelling gas can escape in the time between the removal of the odor trap that is to be replaced and the closing of the additional odor trap, this is a much smaller amount than in the case of the conventional methods. In particular, such a solution translates into a very simple construction. Moreover, it can advantageously be provided that, after the odor trap that is to be replaced has been removed, the additional odor trap can be made accessible through the compartment in which the odor trap that is to be replaced was previously accommodated, and can be closed manually, for instance, by means of a screwdriver.

Regarding the opening of the additional odor trap, for purposes of attaining the smallest possible escape of gas, it is especially advantageous if the additional odor trap is opened after the new odor trap has been inserted, or else at least during the insertion of the new odor trap.

However, it is likewise possible to already open the additional odor trap immediately before inserting the new odor trap. With such an embodiment, even though a small amount of foul-smelling gas can escape in the time between the removal of the odor trap that is to be replaced and the closing of the additional odor trap, this is a much smaller amount than in the case of the conventional methods. In particular, such a solution translates into a very simple construction.

As already mentioned, an automatically controlled actuation mechanism entails the advantage that no additional work steps have to be performed by the service personnel. However, especially in the case of simple configurations, it can be provided that the additional odor trap is opened manually, for example, by means of a universal tool such a screwdriver or a chisel.

In a special embodiment of the invention, it can also be provided that, before the new odor trap is inserted, the additional odor trap is opened as a result of permanent changes, for example, destruction, of at least part of the additional odor trap. Such an embodiment is advantageous, for instance, if the additional odor trap is configured as a refill part for one-time use.

In one especially advantageous embodiment, the additional odor trap is coupled to an actuation mechanism for the opening and/or closing procedure. In an advantageous manner, the actuation mechanism can have at least one actuation lever. In particular, it can be provided that the actuation mechanism has at least one actuation lever which, at least when no insert component has been inserted, protrudes into a compartment for the insert component. This is done particularly in such a way that the actuation lever is displaced out of the compartment when the new odor trap is inserted, whereby the movement executed by the actuation lever in this process causes the additional odor trap to open.

As an alternative or in addition, it can also be provided that the actuation mechanism has at least one actuation lever that can be adjusted by means of the insert component (e.g. the odor trap to be replaced and/or a new odor trap).

In an advantageous manner, it is provided in a special embodiment that the restoring force automatically pushes the actuation mechanism into the closed position. The restoring force can be exerted, for example, by a spring means. Alternatively or additionally, however, it can also be provided that the restoring force is exerted by the force of the weight acting upon the additional odor trap and/or upon a weight that is arranged on the additional odor trap.

As already mentioned, in an advantageous manner, it can be provided for the odor trap that is to be replaced or for the new odor trap to function as the insert component and/or to have the insert component that brings about an opening and/or closing of the additional odor trap, for instance, by means of an actuation mechanism.

Regarding the insert component, it can also be alternatively or additionally provided that the insert component has an inlet for urine that is released into the bowl of the urinal. As an alternative or in addition, it can also be provided that the insert component has a compartment for a disinfectant cube. Alternatively or additionally, it is advantageously also possible for the insert component to have a hood under which the disinfectant cube is positioned and/or can be positioned. Especially advantageously, it is also possible—as an alternative or in addition—to provide that the insert component is configured to be inserted into a bowl and/or into a drainage opening of the urinal.

In particular, it can advantageously be provided that the insert component has at least one gasket so that the insert component can be inserted into a bowl and/or into a drainage opening of the urinal so as to be water-tight and/or gas-tight.

In an advantageous configuration, the additional odor trap has a closure flap. In particular, a closure flap can be provided on which an actuation lever is arranged. In a special embodiment, the actuation lever serves to couple the closure flap to an opening and/or closing mechanism.

It is particularly advantageous if the urinal according to the invention is configured as a dry urinal. An odor-tight sealing of the lines vis-à-vis the fecal sewage lines is particularly important especially in the case of such urinals since flushing with water by the cleaning personnel only takes place at infrequent intervals at best.

Preferably, the additional odor trap is configured in such a way that, for safety reasons, the odor trap opens so as to prevent the urinal bowl from overflowing whenever large amounts of flushing water are poured into the bowl of the urinal. For this purpose, it can be provided, for instance, that the restoring force that acts upon the closure flap of the additional odor trap is limited in such a manner that the closure flap is pushed open by the weight of the flushing water once the amount of flushing water has exceeded a prescribed and/or prescribable value.

Additional objectives, advantages, features and application possibilities of the present invention can be gleaned from the description below of an embodiment making reference to the drawing. In this context, all of the described and/or depicted features on their own or in any meaningful combination constitute the subject matter of the present invention; this also applies irrespective of their compilation in the claims and irrespective of the claims to which they refer back.

DESCRIPTION OF THE DRAWINGS

The following is shown:

FIG. 2 the urinal according to the invention, in the phase of removal of the odor seal or trap that is to be replaced.

DETAILED DESCRIPTION OF EMBODIMENTS

Figure 1:
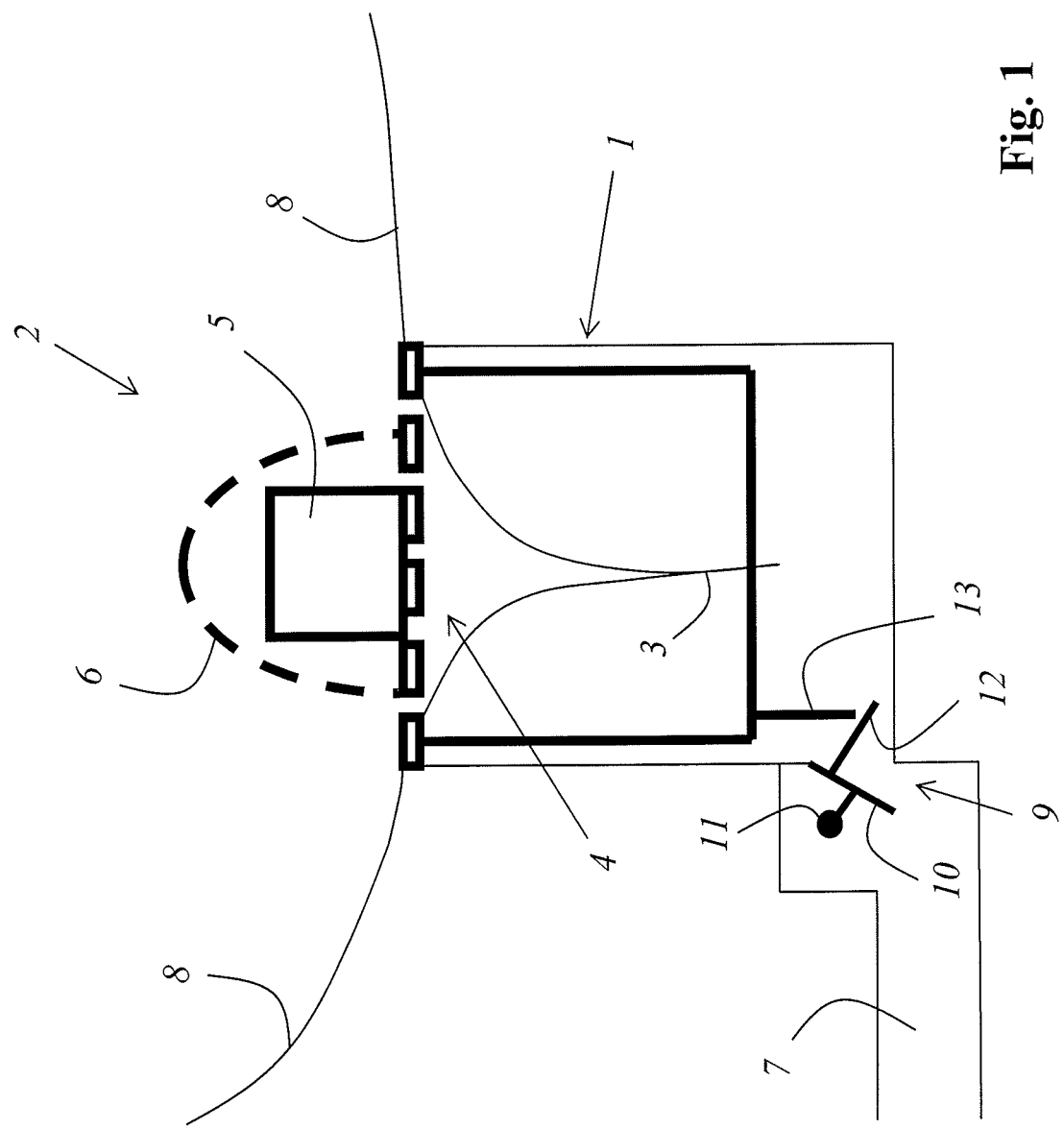
FIG. 1 a detailed view of a urinal according to the invention, with an inserted odor seal or trap that is to be replaced.

FIG. 1 shows a detailed depiction of a urinal according to the invention, with an odor seal or trap 2 to be replaced that had been inserted into a drainage opening 1 of the urinal. The odor trap 2 to be replaced is configured as an insert component having a tube valve 3. Above the tube valve 3, there is a sieve 4 that holds a disinfectant cube 5. A hood 6 with openings is provided which creates a compartment for the disinfectant cube 5.

The odor trap 2 that is to be replaced and that is configured as an insert component is arranged in the drainage opening 1 of the urinal in such a way that urine released into a bowl 8 of the urinal (only partially shown) drains through the sieve 4 and subsequently through the tube valve 3.

The urinal also has an additional odor seal or trap 9 with which the access to a drain line 7 can be closed off so as to be odor-tight. The additional odor trap 9 has a closure flap 10 that serves to close off a passage 11. On the closure flap 10, there is a weight 11 that pushes the closure flap 10 into the closed position by the force exerted by the weight.

Moreover, on the closure flap 10, there is an actuation lever 12 that, when the actuation lever 12 is swiveled downwards, opens the closure flap 10 against the restoring force exerted by the weight 11.

In the depicted situation, a projection 13 arranged on the odor trap 2 that is to be replaced pushes the actuation lever 12 downwards so that the additional odor trap in the depicted situation is opened, as long as the odor trap 2 that is to be replaced remains in the drainage opening 1.

As soon as the odor trap 2 that is to be replaced has been removed from the drainage opening 1, the closure flap 10 is swiveled into the closed position by the weight 11 since the actuation lever 12 is no longer being pushed downwards by the projection 13 arranged on the odor trap 2 that is to be replaced. This is shown in FIG. 2.

After the odor trap 2 that is to be replaced has been removed, a new odor trap can be inserted which, in turn, also has a projection 13. The insertion of a new odor trap causes the actuation lever 12 to be pushed downwards by means of the projection arranged on the new odor trap, so that the additional odor tap is opened once again and remains open as long as the new odor trap 2 remains in the drainage opening 1.

The invention was described in conjunction with one or more special embodiments. It goes without saying, however, that changes and modifications can be undertaken without departing from the protective scope of the claims below.

LIST OF REFERENCE NUMERALS 1 drainage opening
2 odor trap that is to be replaced 3 tube valve
4 sieve
5 disinfectant cube
6 hood
7 drain line
8 bowl
9 additional odor trap
10 closure cap
11 weight
12 actuation lever
13 projection

The invention claimed is:

1. A method for replacing a first odor trap of a urinal, comprising:
   a) removing the first odor trap that is to be replaced from its position in a drain of the urinal at or near the drain opening of the urinal,
   b) closing a second odor trap of the urinal to seal outgoing drain lines of the urinal with a virtually gas-tight isolation, wherein said second odor trap is in the drain of the urinal spaced apart from the drain opening of the urinal and defines a second odor trap closure flap and an actuation lever, wherein closing is by a weight or spring exerting force on the closure flap to bias or push the closure flap into its closed position, and wherein prior to removal of the first odor trap, the second odor trap and the first odor trap are connected in series,
   c) inserting a new odor trap that replaces the removed first odor trap so that the new odor trap is connected in series to the second odor trap, wherein the new odor trap has a new odor trap projection extending outwardly from a bottom wall of the new odor trap and adapted to contact the actuation lever of the second odor trap to open the closure flap when said new odor trap projection is inserted into the urinal and contacts the actuation lever, so that after the new odor trap is installed, urine released into a bowl of the urinal first flows through the new odor trap and subsequently through the second odor trap, and
   d) opening the second odor trap upon insertion of the new odor trap by contact of the new odor trap projection with the actuation lever of the second odor trap to open the closure flap of the second odor trap.

2. The method according to claim 1, wherein the second odor trap is automatically closed when the first odor trap is removed.

3. The method according to claim 1, wherein the second odor trap is opened while the new odor trap is being inserted.

4. The method according to claim 1, wherein the new odor trap is inserted coaxially into the urinal opening to align the projection for contact with the actuation lever without rotating the new odor trap.

5. The method according to claim 1, wherein the closure flap swivels from its open position to its closed position when the first odor trap is removed from the urinal.

6. A urinal, comprising:
   a first odor trap in a drain of the urinal at or near the drain opening of the urinal, said first odor trap having a projection extending outwardly from the first odor trap;
   a second odor trap in the drain of the urinal and connected in series to the first odor trap, the second odor trap comprising a closure flap sealing outgoing drain line(s) of the urinal with a virtually gas-tight isolation while the first odor trap is removed from the urinal to be replaced by a new odor trap when the closure flap is in closed position;
   a weight or spring exerting force on the closure flap to bias or push the closure flap into its closed position; and
   an actuation lever that is activated by contact with the projection of the first odor trap to open the closure flap when said projection is inserted into the urinal and contacts the actuation lever.

7. The urinal according to claim 6, further comprising a new odor trap insertable into the urinal after removal of the first odor trap, the new odor trap having a new odor trap projection extending outwardly and adapted to contact the actuation lever of the second odor trap to open the closure flap when said new odor trap projection is inserted into the urinal and contacts the actuation lever, so that when the new odor trap is installed urine released into a bowl of the urinal first flows through the new odor trap and subsequently through the second odor trap.

8. The urinal according to claim 6, wherein the second odor trap is automatically closed when the first odor trap is removed from the urinal.

9. The urinal according to claim 6, wherein the urinal is configured as a dry urinal.

10. The urinal of claim 6, wherein the closure flap swivels from its open position to its closed position when the first odor trap is removed from the urinal.

11. The urinal of claim 6, wherein the closure flap of the second odor trap swivels from its closed position in response to a specified weight of flushing water introduced into the drain of the urinal.

* * * * *